United States Patent
Reist

(10) Patent No.: US 10,041,577 B2
(45) Date of Patent: Aug. 7, 2018

(54) DEVICE FOR TRANSMITTING A ROTATION MOVEMENT

(71) Applicant: Walter Reist, Hinwill (CH)

(72) Inventor: Walter Reist, Hinwill (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 232 days.

(21) Appl. No.: 15/207,617

(22) Filed: Jul. 12, 2016

(65) Prior Publication Data

US 2017/0016522 A1    Jan. 19, 2017

(30) Foreign Application Priority Data

Jul. 14, 2015   (CH) ...................................... 1025/15

(51) Int. Cl.

| F16H 47/00 | (2006.01) |
|---|---|
| F16H 7/02 | (2006.01) |
| F16H 47/06 | (2006.01) |
| F16H 7/06 | (2006.01) |
| F16H 47/02 | (2006.01) |
| F04C 2/344 | (2006.01) |

(52) U.S. Cl.
CPC ......... *F16H 47/065* (2013.01); *F04C 2/3448* (2013.01); *F16H 7/06* (2013.01); *F16H 47/02* (2013.01)

(58) Field of Classification Search
CPC ................. F16H 47/065; F16H 47/07; F16H 2007/0865; F16H 2007/087; F16H 7/02
USPC ...................... 74/720; 474/137, 86
See application file for complete search history.

(56) References Cited

U.S. PATENT DOCUMENTS

| 904,582 A | * | 11/1908 | Wallace | ................... F16H 7/02 |
| | | | | 474/86 |
| 2,162,624 A | * | 6/1939 | Logue | ....................... F16H 7/02 |
| | | | | 209/269 |

(Continued)

FOREIGN PATENT DOCUMENTS

| DE | 34 28 963 | 3/1985 |
| DE | 40 06 389 | 9/1991 |
| EP | 2 466 168 | 6/2012 |

OTHER PUBLICATIONS

Switzerland Search Report dated Nov. 27, 2015, Application No. CH 10252015.

*Primary Examiner* — Ha Dinh Ho
(74) *Attorney, Agent, or Firm* — Rankin, Hill & Clark LLP

(57) ABSTRACT

A device for transmitting a rotation movement includes first and second force transmission sections, each with a drive input and a drive output, and with a first chain guide. The chain guide is arranged between the drive input and output and accommodates an endless chain, which circulates between the drive input and drive output. A middle force transmission section with a middle drive input and a middle drive output, and with a conduit that is arranged between these. The conduit accommodates a hydraulic fluid and transmits forces between the first and the second force transmission section. The hydraulic fluid circulates between the middle drive input and the middle drive output and transmits push forces between the middle drive input and the middle drive output. The first drive output is coupled to the middle drive input, and the middle drive output is coupled to the second drive input.

11 Claims, 2 Drawing Sheets

(56) References Cited

U.S. PATENT DOCUMENTS

| | | | | |
|---|---|---|---|---|
| 2,966,746 A | * | 1/1961 | Mellbin | F26B 13/14 |
| | | | | 226/118.1 |
| 3,035,400 A | * | 5/1962 | Stahlecker | D01H 1/241 |
| | | | | 474/137 |
| 3,095,757 A | | 7/1963 | Thoma | |
| 3,808,813 A | | 5/1974 | Spinks | |
| 4,377,260 A | * | 3/1983 | Huffman | B02C 4/42 |
| | | | | 241/101.2 |
| 4,624,333 A | * | 11/1986 | Minor | B62D 11/02 |
| | | | | 180/6.48 |
| 4,856,644 A | | 8/1989 | Reist | |
| 4,893,460 A | * | 1/1990 | Wolf | D01H 1/241 |
| | | | | 57/100 |

\* cited by examiner

DEVICE FOR TRANSMITTING A ROTATION MOVEMENT

BACKGROUND OF THE INVENTION

Field of the Invention

The invention relates to the field of drive technology, and concerns a device for transmitting a rotation moment.

Description of Related Art

Such a drive device is known for example from DE 3 428 963 A1. This device, which is represented in FIG. 1, serves for transmitting a rotation movement from a drive input A (also sometimes simply called drive) to a drive output B (often termed as power take-off), in each case in a deflection casing 1a, 1b, by way of closed, flexible chain guides 7a, 7b, wherein the force transmission is carried out by way of a push-capable and pull-capable continuous chain 5. The flexible chain guides 7a, 7b, for example, consist of a flexible tube which is bendable in all spatial directions and whose interior is used as a chain channel. The drive device amongst other things has the advantages that the drive input and drive output can be assembled in almost arbitrary positions, that complex gears can be replaced, that a step-up transmission and step-down transmission can be realised, and that that both chain rungs transmit force: the one transmits pull forces and the other transmits push forces, which leads to a force-compensating effect. Also several drive inputs and/or several drive outputs can be present on the same chain, and thus drive forces from several drives can be summed or distributed onto several drive outputs, in a simple manner.

However, it has been found that the drive device is limited with regard to the allowable deflection radii of the chain guides: small deflection radii and complicated courses of the chain guide increase the friction of the continuous chain on the chain guide. Moreover, it has been found that on use, the lubrication that is necessary for reducing the friction is consumed relatively rapidly and must be continuously re-fed, due to the lubricant being carried off in the running direction. The subsequently necessary cleaning of accumulations of the lubricant in the chain tracks and in particular at the transition locations can only be carried out with a forced standstill of the facility, which however is actually designed for permanent operation. The running-down of the facility, which is necessary for this is operatively extremely undesirable.

SUMMARY OF THE INVENTION

It is therefore the object of the invention, to create a device for transmitting a rotation movement of the initially mentioned type, which overcomes the disadvantages mentioned above, wherein however the advantages of the known device are to be retained as far as possible.

The device according to the present invention includes:
a first force transmission section with a first drive input and at least one first drive output, and with a first chain guide that is arranged between these and is for accommodating a first continuous chain transmitting push forces and pull forces, wherein the first continuous chain circulates between the first drive input and the first drive output and transmits at least one of push or pull forces between the first drive input and the first drive output;

a second force transmission section with a second drive input and with at least one second drive output, and with a second chain guide which is arranged between these and is for accommodating a second continuous chain transmitting push and pull forces, wherein the second continuous chain circulates between the second drive input and the second drive output and transmits at least one of push or pull forces between the second drive input and the second drive output;

wherein a middle force transmission section with a middle drive input and a middle drive output, and with a conduit that is arranged between these, for accommodating a hydraulic fluid, is provided for the transmission of forces between the first and the second force transmission section, wherein the hydraulic fluid circulates between the middle drive input and the middle drive output and transmits push forces between the middle drive input and the middle drive output;

thereby, the first drive output is coupled to the middle drive input, and the middle drive output is coupled to the second drive input.

Thus a drive system that is basically based on the force transmission by way of a chain is modified to the extent that a section is arranged therebetween, this section being based on force transmission by way of hydraulic fluid.

It becomes possible to overcome spatial or design obstacles by way of the middle force transmission section on account of this, wherein such obstacles would render the application of a the non-modified drive device impossible. The advantages of the chain-based drive are retained for the non-modified sections, thus for the first and second force transmission section. This for example relates to the division of the drive force into a pulling force and pushing force and the possibility of applying several drive inputs or drive outputs.

Moreover, the sections, in which chains for force transmission are present, can be applied in precarious environments, for example environments of a high temperature, where the use of hydraulic fluids would not be possible, thus where a purely hydraulic system could not be applied.

In an embodiment, the first chain guide and the second chain guide, in regions outside the respective drive input and the respective drive output comprise deflection regions, wherein the deflection regions in each case have a radius of curvature, and the radii of curvature of the deflection regions of both chain guides in each case do not fall short of a first dimension.

The first and second force transmission section therefore tend to have sections that are curved to a lesser extent. Radii of curvature of the chain guides, for example, are larger than 10 cm, or larger than 20 cm or larger than 30 cm.

It is to be understood that in regions, in which a radius of curvature continuously varies, for example by way of it becoming continuously smaller departing from a straight section and then increasing again, the smallest radius of curvature can be considered as the significant radius of curvature for this region.

In an embodiment, the conduit of the middle force transmission section includes conduit deflection regions in regions outside the middle drive input and the middle drive output, wherein the conduit deflection regions each have a radius of curvature, and the radii of curvature of the conduit deflection regions each fall short of a second dimension.

The middle force transmission section thus tends to have sections that are curved to a greater extent. Radii of curvature of the conduits for example are smaller than 30 cm or smaller than 20 cm or smaller than 10 cm.

In an embodiment, the conduits are formed by pipes that can be bent and then have a defined radius of curvature. However, it is also possible to form the conduits by way of cavities in freely formed or shaped bodies, thus manufactured by moulding, injecting or milling. In such cases, the course of a middle line through such a cavity can be used for the definition of the course of the conduit and thus of the curvature.

In an embodiment, the second dimension is smaller than the first one. The largest radius of curvature of the conduits of the middle force transmission section is therefore smaller than the smallest radius of curvature of the chain guides of the first and second force transmission section. With this, the middle force transmission section can lie in regions in which the application of a chain-based force transmission would not be possible due to the necessary small radii of curvature.

In an embodiment, the second dimension is less than half or less than quarter the first dimension.

In an embodiment, the middle force transmission section is arranged for overcoming a wall or a ceiling of a building, or generally in a region, in which little space is available—for example a small room, a corner region of a room etc. Here, tight curvatures can be necessary, and are overcome by way of hydraulic force transmission.

In an embodiment and in a reverse operational manner, at least one of the drive inputs can be operated as a drive output and/or at least one of the drive outputs as a drive input. Generally speaking, each drive input or drive output can be considered as a converter that acts as a drive input or drive output, depending on the direction of the force transmission.

In particular in one variant of a reverse operational manner, the complete device can be operated in the reverse direction, thus by way of a drive force being transmitted via the second, then middle and then the first force transmission section. A reverse operational manner alternating with a non-reversed operational manner can also be present. The converters (drive inputs and drive outputs) thereby change their function in an alternating manner over time.

In an embodiment, the middle drive input and/or the middle drive output are realised by a vane cell pump.

In an embodiment, at least one of the vane cell pumps includes a force transmission region, in which drive elements and driven elements for the force transmission to and from the hydraulic fluid respectively immerse, and form a closed cell, and this force transmission region in the circumferential direction occupies a region of at least 150 degrees and in particular of at least 180 degrees.

BRIEF DESCRIPTION OF THE DRAWINGS

The subject-matter of the invention is hereinafter explained in more detail by way of preferred embodiment examples which are represented in the accompanying drawings. In each case are shown schematically in.

DETAILED DESCRIPTION OF THE INVENTION

Figure 1:
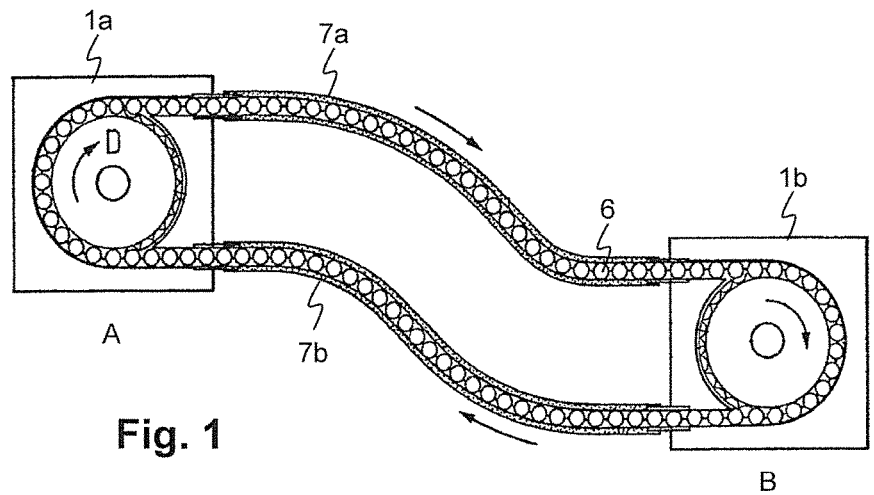
FIG. 1 a drive device according to the state of the art.

Basically in the figures, the same or equally acting parts are provided with the same reference numerals.

Figure 2:
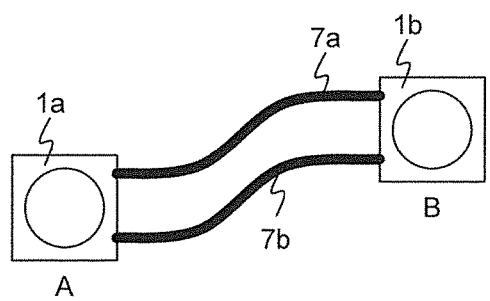
FIG. 2 a simplified representation of this.

FIG. 2 shows a simplified representation of the drive device according to the state of the art from FIG. 1. The elements represented therein in a simplified manner, such as chain guides, 7a, 7b and deflection housing 1a, 1b for realising a drive input A and a drive output B respectively (or vice versa), are likewise used in the subsequent figures.

Figure 3:
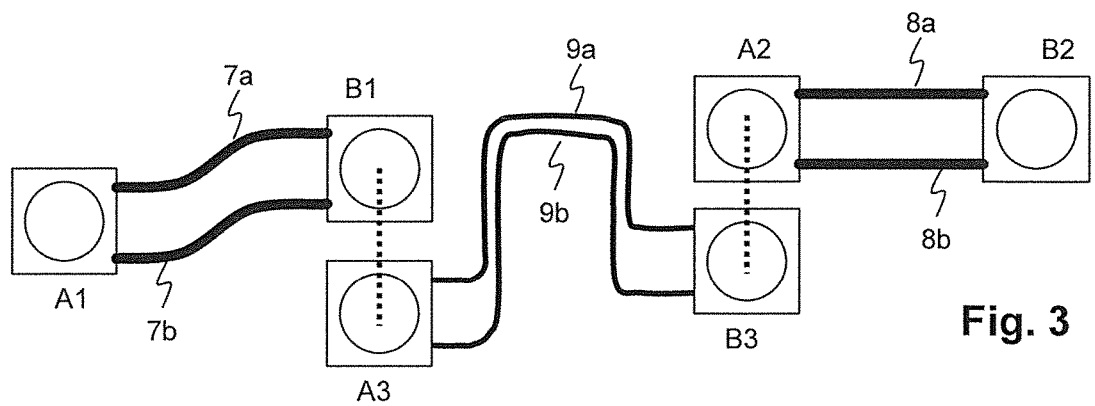
FIG. 3-4 drive devices according to embodiment examples of the invention, with differently designed force transmission sections.

FIG. 3 shows a drive device with differently designed force transmission sections.

A first force transmission section includes a first drive input A1 and a first drive output B1 and a first chain guide 7a, 7b arranged between these and with a circulating first continuous chain that transmits push forces and pull forces and transmits push forces or pull forces between the first drive input A1 and the first drive output B1.

A second force transmission section includes a second drive input A2 and a second drive output B2 and second chain guide 8a, 8b arranged between these and with a circulating second continuous chain that transmits push forces and pull forces and transmits push forces or pull forces between the second drive input A2 and the second drive output B2.

A middle force transmission section includes a middle drive input A3 and a middle drive output B3, and a conduit 9a, 9b that is arranged between these and is for accommodating a hydraulic fluid, wherein the hydraulic fluid circulates between the middle drive input A3 and the middle drive output B3 and transmits push forces between the middle drive input A3 and the middle drive output B3.

The first driven output B2 is coupled to the middle drive input A3, and the middle drive output B3 is coupled to the second drive input A2, i.e. the drive outputs or drive inputs that are coupled to one another transmit forces and movements in both directions.

The middle force transmission section with the conduits 9a, 9b can have essentially arbitrary small radii of curvature and a course that is complicated with regard to shape and that could not be realised with a chain-based force transmission.

Figure 4:
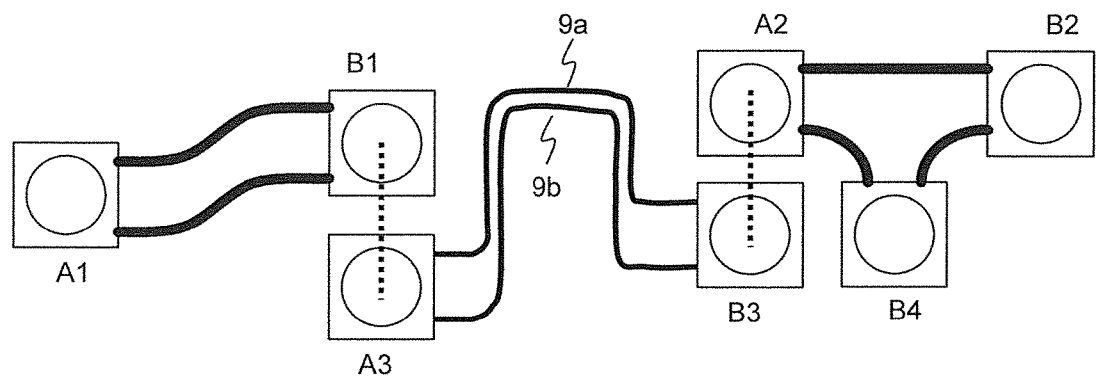

FIG. 4 shows another drive device with differently designed force transmission sections. Here, a further drive output B4, which is likewise driven by the second drive input, is arranged in the second force transmission section next to the second drive output B2. In further embodiments, further drive inputs and/or drive outputs lie in the first and/or the second force transmission section in an analogous manner.

Figure 5:
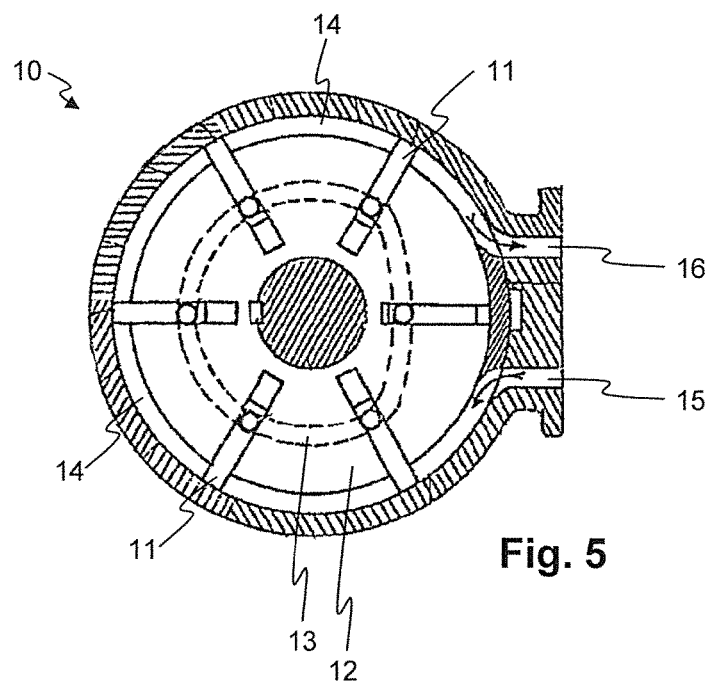
FIG. 5 a hydraulic drive input or drive output.

FIG. 5 shows a hydraulic drive input or drive output 10, as can be applied in the middle force transmission section of the previously mentioned embodiments. Slides 11 are mounted in a manner displaceable in the radial direction, in a rotating disc or drum 12. The disc or drum 12 is connected to a drive shaft or driven shaft. The radial displacement of the slides 11 is controlled by way of a cam curve 13. The slides 11 in an extended condition project into a delivery channel and form delivery sections 14, which are sealed to one another and by way of which a hydraulic fluid can be delivered from a first connection 15 to a second connection 16. The device thus acts as a drive input for converting a movement of the drive shaft. Vice versa, a fluid subjected to pressure can be present at one of the connections and bring the slides 11 and thus the disc and drum 12 and the connected shaft into rotation. The device thus acts as a drive output for driving the driven shaft.

A circumferential region, in which the delivery sections 14 are present, can for example be maximally approx. 4·60=240 degrees or approx. 5·60=300 degrees and minimally be approx. 3·60=180 degrees or approx. 4·60=240 degrees, depending on the rotation angle of the disc or drum 12.

The invention claimed is:

1. A device for transmitting a rotation movement, comprising
a first force transmission section with a first drive input and at least one first drive output, and with a first chain guide that is arranged between first drive input and the first drive output and is for accommodating a first continuous chain transmitting push forces and pull forces, wherein the first continuous chain circulates between the first drive input and the first drive output and transmits at least one of push or pull forces between the first drive input and the first drive output;
a second force transmission section with a second drive input and with at least one second drive output, and with a second chain guide that is arranged between these and is for accommodating a second continuous chain transmitting push and pull forces, wherein the second continuous chain circulates between the second drive input and the at least one second drive output and transmits at least one of push or pull forces between the second drive input and the second drive output;
a middle force transmission section for the transmission of forces between the first and the second force transmission section with a middle drive input and a middle drive output, and with a conduit that is arranged between the middle drive input and the middle drive output for accommodating a hydraulic fluid, wherein the hydraulic fluid circulates between the middle drive input and the middle drive output and transmits push forces between the middle drive input and the middle drive output;
wherein the first drive output is coupled to the middle drive input, and the middle drive output is coupled to the second drive input.

2. The device according claim 1, wherein the first chain guide and the second chain guide, in regions outside the respective drive input and the respective drive output, comprise deflection regions, wherein the deflection regions in each case have a radius of curvature, and the radii of curvature of the deflection regions of both chain guides in each case do not fall short of a first dimension.

3. The device according to claim 1, wherein the conduits of the middle force transmission section, in regions outside the middle drive input and the middle drive output, comprise conduit deflection regions, wherein the conduit deflection regions each have a radius of curvature, and the radii of curvature of the conduit deflection regions each fall short of a second dimension.

4. The device according to claim 3, wherein the second dimension is smaller than the first dimension.

5. The device according to claim 4, wherein the second dimension is less than half or less than a quarter of the first dimension.

6. The device according to claim 2, wherein the radii of curvature of the deflection regions of the two chain guides are larger than 30 cm.

7. The device according to claim 3, wherein the radii of curvature of the conduit deflection regions are smaller than 10 CM.

8. The device according to claim 1, wherein the middle force transmission section is arranged for overcoming a wall or a ceiling of a building.

9. The device according to claim 1, wherein in a reverse operational manner, at least one of the drive inputs can be operated as a drive output and/or at least one of the drive outputs can be operated as a drive input.

10. The devices according to claim 1, wherein the middle drive input and/or the middle drive output is realized by a vane cell pump.

11. The device according to claim 10, wherein at least one of the vane cell pumps comprise a force transmission region, in which drive elements and driven elements for the force transmission to and from the hydraulic fluid respectively, immerse into this fluid and form a closed cell, and this force transmission region in the circumferential direction occupies a region of at least 150 degrees and in particular of at least 180 degrees.

* * * * *